United States Patent
Rumreich

(10) Patent No.: US 9,007,532 B2
(45) Date of Patent: Apr. 14, 2015

(54) VARIABLE AND INTERLEAVED SCANNING IN LASER PROJECTORS

(75) Inventor: Mark Francis Rumreich, Indianapolis, IN (US)

(73) Assignee: Thomson Licensing, Issy-les Moulineaux (FR)

( * ) Notice: Subject to any disclaimer, the term of this patent is extended or adjusted under 35 U.S.C. 154(b) by 0 days.

(21) Appl. No.: 14/123,742

(22) PCT Filed: May 26, 2012

(86) PCT No.: PCT/US2012/039773
§ 371 (c)(1),
(2), (4) Date: Dec. 3, 2013

(87) PCT Pub. No.: WO2012/166682
PCT Pub. Date: Dec. 6, 2012

(65) Prior Publication Data
US 2014/0092316 A1 Apr. 3, 2014

Related U.S. Application Data

(60) Provisional application No. 61/520,068, filed on Jun. 3, 2011.

(51) Int. Cl.
H04N 5/64 (2006.01)
H04N 9/31 (2006.01)
G02B 26/10 (2006.01)

(52) U.S. Cl.
CPC ............ *H04N 9/3129* (2013.01); *G02B 26/101* (2013.01); *H04N 9/3135* (2013.01)

(58) Field of Classification Search
USPC ......... 348/744, 745, 195, 552, 746, 747, 753, 348/751, 792, 793, 763, 768, 780, 800, 348/811; 359/202.1, 204.1, 618
See application file for complete search history.

(56) References Cited

U.S. PATENT DOCUMENTS 3,941,996 A * 3/1976 Stauffer ..................... 250/201.7
6,515,781 B2 * 2/2003 Lewis et al. ................ 359/199.1
(Continued)

FOREIGN PATENT DOCUMENTS

CN 2879313 Y 3/2007
CN 201689258 U 12/2010
(Continued)

OTHER PUBLICATIONS

Khan et al., "A low-resolution 3D holographic volumetric display," Proc. of SPIE 2010, vol. 7723, pp. 77231B-1 to 77231B-7.
(Continued)

*Primary Examiner* — Paulos M Natnael
(74) *Attorney, Agent, or Firm* — Robert D. Shedd; Richard LaPeruta

(57) ABSTRACT

A method of operating a miniature projector that comprises: receiving image data to project; generating light beams for a screen; scanning the light beams according to a first pattern from a first edge to an ending edge in the screen to form at least one image, the first pattern being a wave pattern of scan lines such that amplitudes oscillate along a first axis as the beams progressively scan along a second axis, the second axis being substantially perpendicular to the first axis, wherein the first pattern has a first oscillation from the first edge that is directed in a first direction along the first axis; and scanning the light beams according to a second pattern from a second edge to a second ending edge for the screen to form at least another image, the second pattern being a wave pattern of scan lines such that amplitudes oscillate along the first axis as the beams progressively scan along the second axis, wherein the second pattern has a first oscillation from the second edge that is directed in a second direction along the first axis that is opposite the first direction.

20 Claims, 10 Drawing Sheets

(56) References Cited

U.S. PATENT DOCUMENTS

| | | |
|---|---|---|
| 6,600,168 B1 | 7/2003 | Geng |
| 7,049,585 B2 * | 5/2006 | Nakasuji et al. ............. 250/310 |
| 7,252,394 B1 | 8/2007 | Fu |
| 7,312,919 B2 * | 12/2007 | Overbeck ..................... 359/368 |
| 7,334,901 B2 | 2/2008 | El-Ghoroury |
| 7,385,180 B2 | 6/2008 | Rueb et al. |
| 7,486,274 B2 | 2/2009 | Forlines et al. |
| 7,859,567 B2 * | 12/2010 | He et al. ....................... 348/195 |
| 7,986,340 B2 * | 7/2011 | He et al. ....................... 348/195 |
| 8,384,775 B2 * | 2/2013 | Yamazaki ........................ 348/97 |
| 2002/0071287 A1 | 6/2002 | Haase |
| 2002/0154396 A1 * | 10/2002 | Overbeck ..................... 359/368 |
| 2004/0119004 A1 | 6/2004 | Wine et al. |
| 2004/0136204 A1 | 7/2004 | Asao |
| 2007/0035508 A1 | 2/2007 | Yamazaki et al. |
| 2007/0070310 A1 | 3/2007 | Ryu et al. |
| 2007/0229668 A1 * | 10/2007 | He et al. ....................... 348/195 |
| 2008/0247165 A1 | 10/2008 | Schultz |
| 2009/0021801 A1 * | 1/2009 | Ishihara ........................ 358/475 |
| 2010/0182668 A1 | 7/2010 | Abe et al. |
| 2010/0259511 A1 | 10/2010 | Kimura et al. |
| 2010/0275496 A1 | 11/2010 | Solinsky et al. |
| 2011/0063527 A1 * | 3/2011 | He et al. ....................... 348/744 |
| 2011/0069363 A1 | 3/2011 | Chikaoka et al. |
| 2011/0141441 A1 | 6/2011 | Konno et al. |
| 2014/0098302 A1 * | 4/2014 | Rumreich .................... 348/744 |

FOREIGN PATENT DOCUMENTS

| | | |
|---|---|---|
| EP | 1646224 A1 | 12/2006 |
| EP | 1870766 A1 | 12/2007 |
| EP | 2271121 A2 | 1/2011 |
| JP | 3-081722 A | 4/1991 |
| JP | 2000-321531 A | 11/2000 |
| JP | 2006-072221 A | 3/2006 |
| JP | 2007-114767 A | 5/2007 |
| JP | 2008-089931 A | 4/2008 |
| JP | 2008-089934 A | 4/2008 |
| JP | 2009-198988 A | 9/2009 |
| JP | 2010-271433 A | 12/2010 |
| KR | 2008-050722 A | 6/2008 |
| TW | M298269 U | 9/2006 |
| WO | WO2010067354 A1 | 6/2010 |

OTHER PUBLICATIONS

Tsuruta et al., "An Advanced High-Resolution, High-Brightness LCD Color Video Projector," SMPTE Motion Imaging Journal, Society of Motion Picture and Television Engineers, White Plains, NY, vol. 101, No. 6, Jun. 1, 1992, pp. 399-403.

Van Den Brandt et al., "New plusfactors in an LCD-projector: homogeneous illumination, quick lamp (re-)start, reliable construction, full resolution NTSC," Proceedings of the International Display Research Conference, San Diego, CA, Oct. 15, 1991, vol. Conf. 11, pp. 151-154.

Search Report Dated Sep. 27, 2012.

Search Report of PU110054 (Related Case) Dated Nov. 2, 2012.

\* cited by examiner

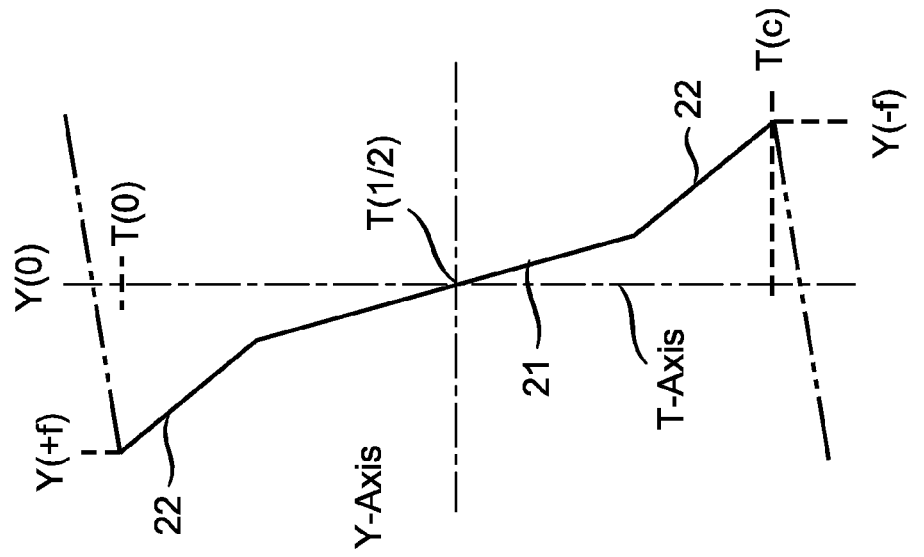
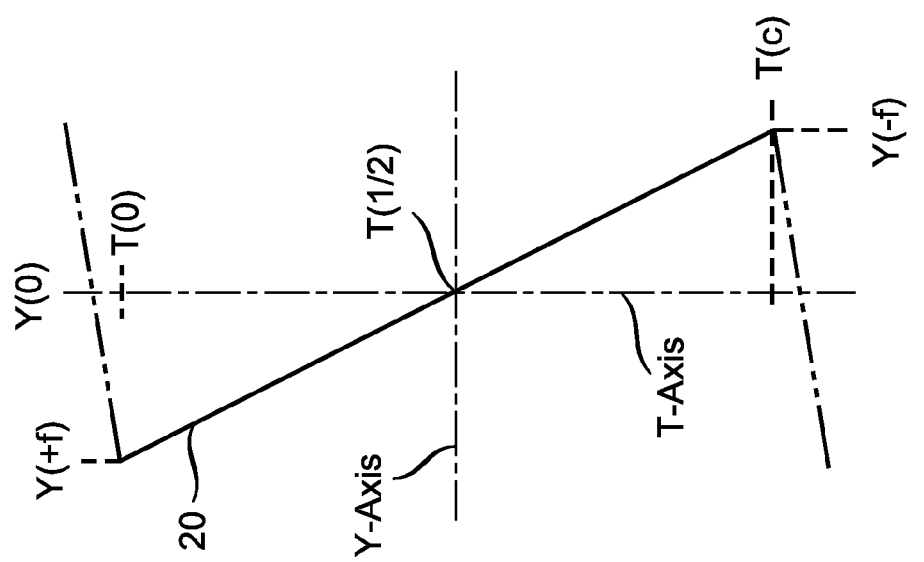

VARIABLE AND INTERLEAVED SCANNING IN LASER PROJECTORS

CROSS-REFERENCE TO RELATED APPLICATIONS

This application claims the benefit, under 35 U.S.C. §365 of International Application PCT/US2012/039773, filed May 26, 2012, which was published in accordance with PCT Article 21(2) on Dec. 6, 2012 in English and which claims the benefit of U.S. provisional patent application No. 61/520,068, filed Jun. 3, 2011, and this application relates to U.S. Provisional Application 61/520,067 filed Jun. 3, 2011.

FIELD OF THE INVENTION

The invention relates to miniature projectors and methods for operating miniature projectors.

BACKGROUND

Miniature laser projectors, which have been referred to as pico projectors, nano projectors, and micro projectors, are generally battery operated portable projectors that have been gaining popularity because their small size makes them convenient for certain applications. The devices can be connected to handheld devices or laptops and can display images on screens or walls.

Unfortunately, miniature laser projectors generally exhibit low light output, thereby limiting their utility to environments with low ambient background light. These laser-based units typical display power in the order of only 1 mW.

Maximum brightness for these devices can be increased by increasing the power of the output; however, such increases in power can be detrimental. From a health perspective, increases in laser power can augment the possibly of damage to eyes. From an operational perspective, increases in laser power can drain battery power rapidly and create excessive heat that must be dissipated to avoid damaging the laser diode or changing the operational performance.

Modulation of the horizontal scan velocity in the fast scan axis has been considered to improved peak bright in miniature displays, which had been incorporated in CRT displays to improve the apparent sharpness of edges; however, this was not used to increase brightness.

In conventional laser projectors, a moving micromirror is used to raster scan the laser beam in a manner that is analogous to the steering of electron beams in cathode ray tubes. The horizontal scan motion is created by running the horizontal axis at its resonant frequency, which is typically about 18 KHz. The horizontal scan velocity varies sinusoidally with position. A scan controller uses feedback from sensors on the scanner to keep the system on resonance and at a fixed scan amplitude. The image is drawn in both directions as the scanner sweeps the beam back and forth. This helps the system efficiency in two ways. First, by running on resonance, the power required to drive the scan mirror is minimized. Second, bi-directional horizontal scanning of video maximizes the laser use efficiency by minimizing the video blanking interval. Bi-directional implies that the laser is emitting light during both left and right sweeps of the laser beam (or up and down sweeps if the raster scan pattern is rotated). This results in a brighter projector for any given laser output power.

The vertical scan direction is traditionally driven with a standard sawtooth waveform to provide constant velocity from the top to the bottom of the image and a rapid retrace back to the top to begin a new frame as shown in FIG. 1. The frame rate is typically 60 Hz for an 848×480 WVGA resolution; the frame rate or resolution can be increased under some conditions or for some particular application requirements.

In light of the limited utility of miniature laser displays and possible safety and performance concerns associated increasing laser power, a need exists to more optimally operate miniature laser displays.

SUMMARY OF THE INVENTION

A method is provided that comprises the steps of: receiving image data for images to scan; generating light beams responsive to the image data; scanning the light beams according to a first pattern from a first edge to an ending edge in a screen to form at least one image, the first pattern being a wave pattern of scan lines such that amplitudes oscillate along a first axis (X-axis) as the beams progressively scan along a second axis (Y-axis), the second axis being substantially perpendicular to the first axis, wherein the first pattern has a first oscillation from the first edge that is directed in a first direction along the first axis; and scanning the light beams according to a second pattern from a second edge to a second ending edge for the screen to form at least another image, the second pattern being a wave pattern of scan lines such that amplitudes oscillate along the first axis as the beams progressively scan along the second axis, wherein the second pattern has a first oscillation from the second edge that is directed in a second direction along the first axis that is opposite the first direction. Ideally the source of the beams can be positioned centrally in front of the screen such that the beams at the central portions of the screen are perpendicular to the screen; however, because systems incorporating the invention are generally mobile, the relational positioning can vary. In some cases, the source can be lower than the center of the screen, but can still be laterally centered. The method can include alternatingly scanning a plurality of the first and second patterns of the light beams. Additionally, the method can include configuring or processing the image data to be n number of complete frames of video, wherein n is a whole number, the first patterns correspond to odd number frames of the n number of complete frames and the second patterns correspond to the even number frames of the n number of complete frames, and the first edge and second can be equidistant from the first axis. Alternatively, the method can comprise configuring or processing the image data to be n number of complete frames of video having m scan lines oriented along the first axis; configuring each complete frame to comprises a first subframe and a second subframe; assigning some rows of the m scan lines to the first subframe, wherein the first patterns correspond to the first subframe; and assigning other rows of the m scan lines to the second subframe, wherein the second patterns can correspond to the second subframe and the first edge and the second edge can be at different distances from the first axis.

Embodiments of the invention can further comprising employing a variable scan velocity values in the second axis, wherein scan velocity values can be responsive to brightness levels required for the image data or the scan velocity values can be inversely related to a total brightness levels required for complete scan lines that are oriented along the first axis. Such embodiment can include configuring the scan lines to be non-uniformly spaced, wherein the image data comprises n number of complete frames of video and there are a fixed number of scan lines from one frame to another frame, wherein the scan line spacing values can be responsive to brightness levels required for the image data or the spacing values can be inversely related to a total brightness levels required for complete scan lines of the image data that are oriented along the first axis.

Embodiments of the invention are to a miniature projectors that comprise: a source of at least three different light beams of different color; a means for scanning the light beams to a viewing surface; a means of generating a first pattern, the first pattern being a wave pattern of scan lines such that amplitudes oscillate along a first axis (X-axis) as the beams progressively scan along a second axis (Y-axis) that is perpendicular to the first axis, the first pattern has a first oscillation from a first edge that is directed in a first direction along the first axis, wherein the scanning means is adapted to scan the light beams according to the first pattern from the first edge to an ending edge on the viewing surface to form at least one image; a means of generating a second pattern, the second pattern being a wave pattern of scan lines such that amplitudes oscillate along the first axis as the beams progressively scan along the second axis, the second pattern has a first oscillation from a second edge that is directed in a second direction along the first axis that is opposite the first direction, wherein the scanning means is adapted to scan the light beams according to the second pattern from the second edge to a second ending edge in the viewing surface to form at least another image and wherein the scanning means is adapted to alternatingly scan a plurality of the first and second patterns of the light beams. In the miniature projector, the means for scanning can be configured to process image data to be n number of complete frames of video having m scan lines oriented along the first axis; the means for scanning can be configured to have each complete frame comprise a first subframe and a second subframe; the means for scanning can be configured to assign odd number rows of the m scan lines to the first subframe, wherein the first patterns correspond to the first subframe; and the means for scanning can be configured to assign even number rows of the m scan lines to the second subframe, wherein the second patterns correspond to the second subframe. Alternatively, the means for scanning can be configured to process the image data to be n number of complete frames of video, wherein n is a whole number, the first patterns corresponding to odd number frames of the n number complete frames and the second patterns correspond to the even number frames of n number of complete frames. Additionally, the miniature projector can be configured to vary scan velocity values within each of the first patterns and seconds patterns responsive to brightness levels required for the image data such that the scan velocity values are inversely related to a total brightness levels required for complete scan lines that are oriented along the first axis.

BRIEF DESCRIPTION OF THE DRAWINGS

The invention will be explained in detail with reference to the drawings in which:

FIG. 3 shows component vertical scan patterns for a uniform brightness frame and a video image having non-uniform brightness frame;

Figure 4:
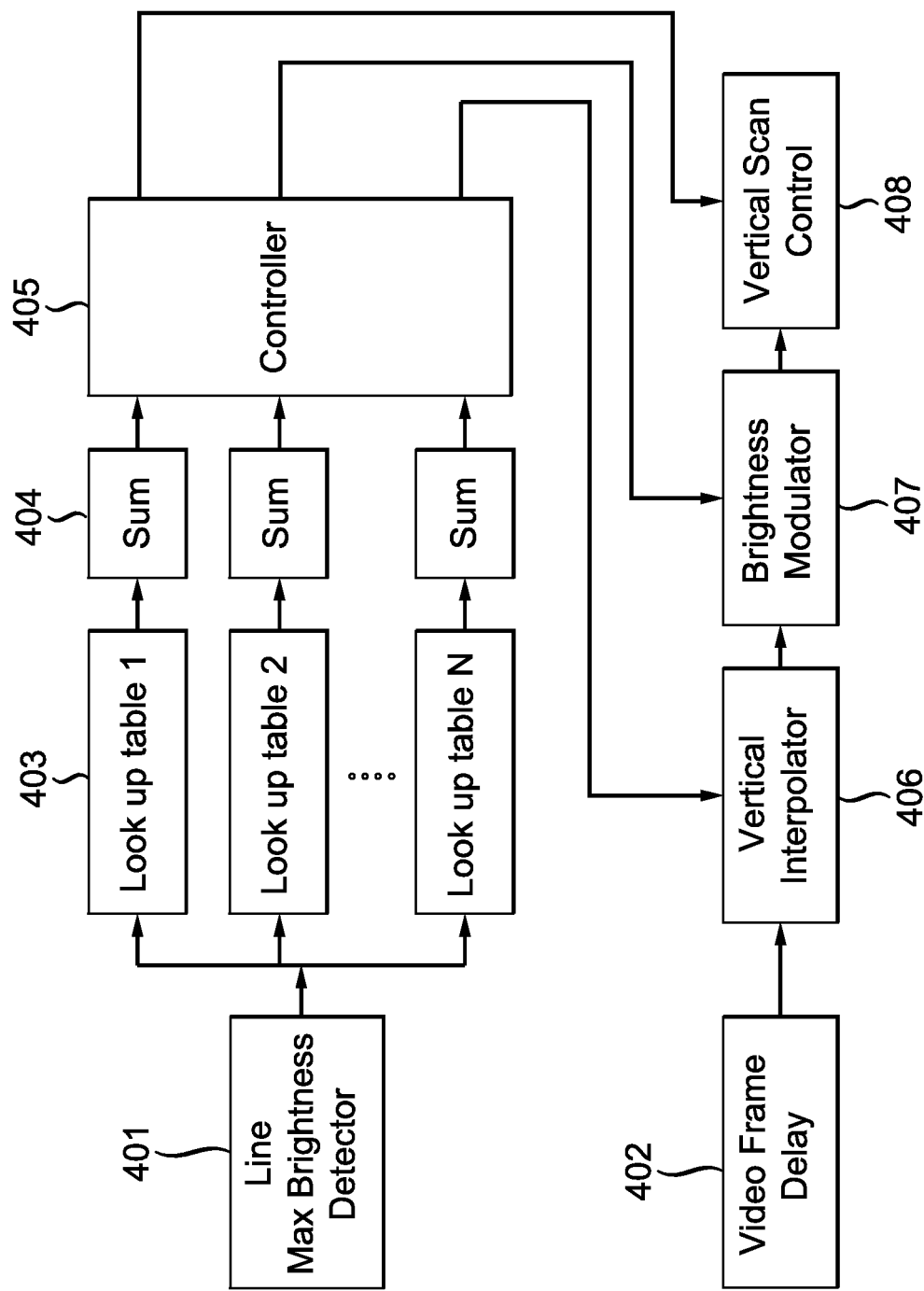
Figure 6:
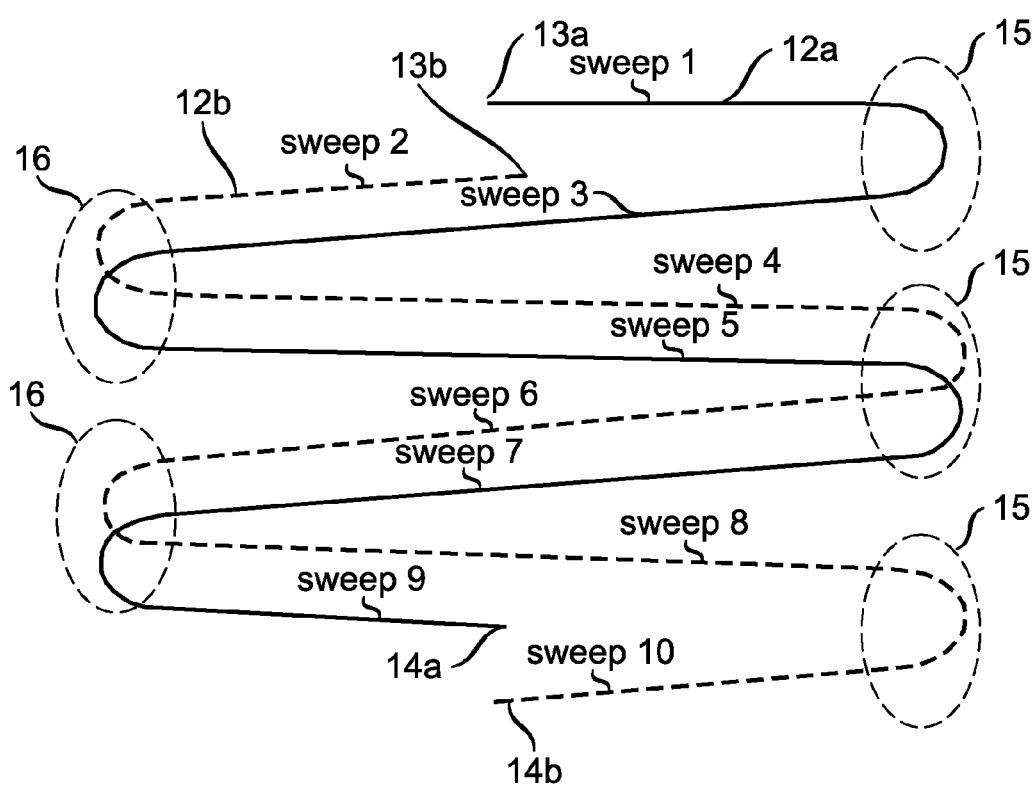
Figure 7:
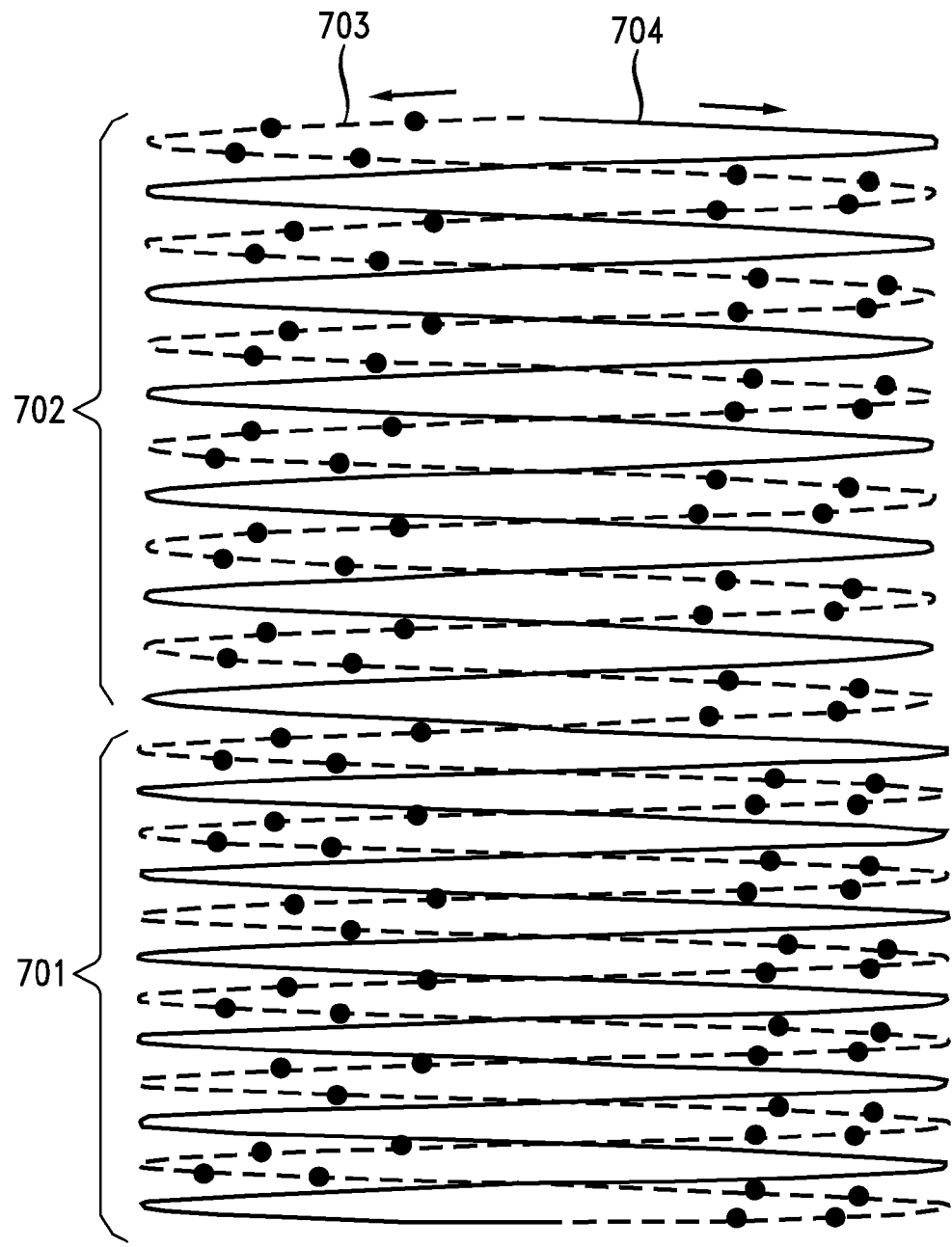
Figure 8:
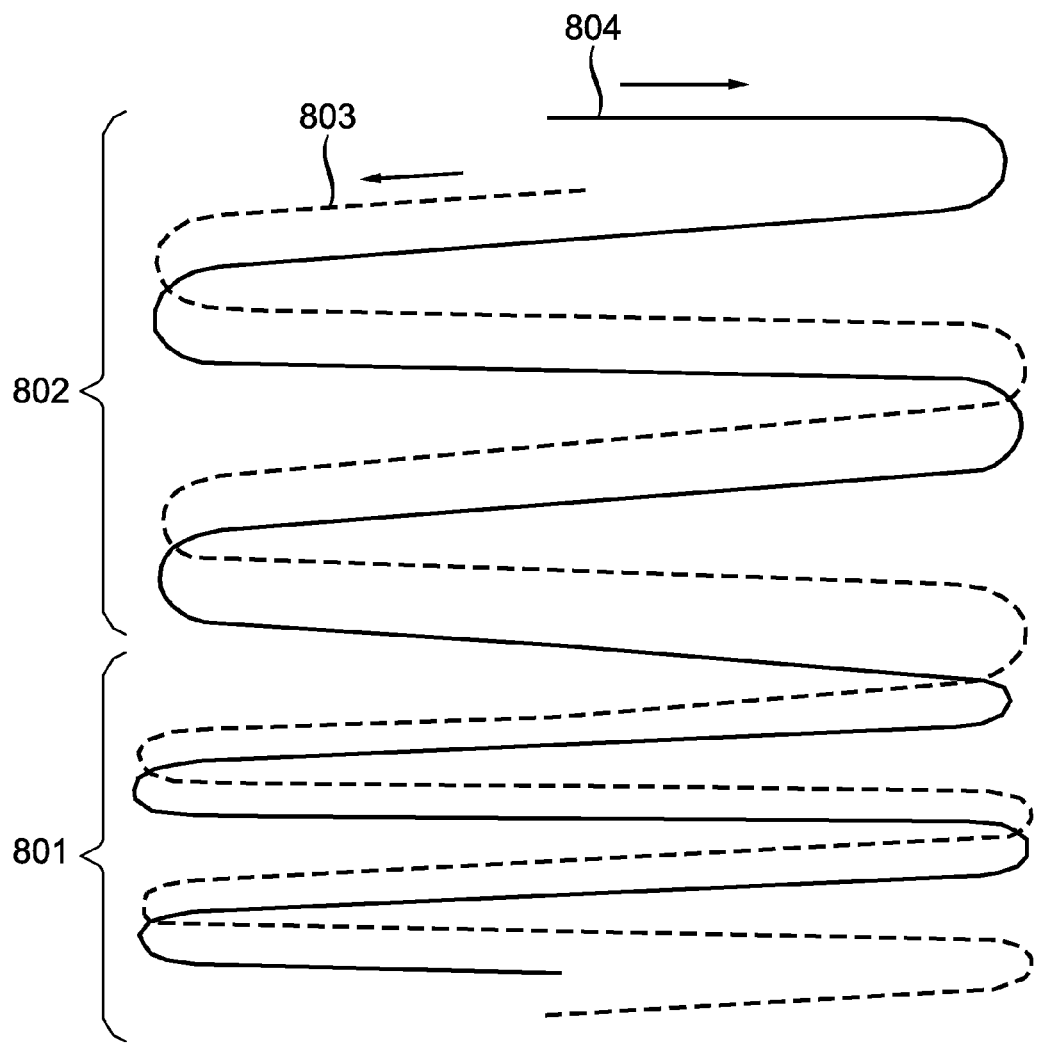
Figure 9:
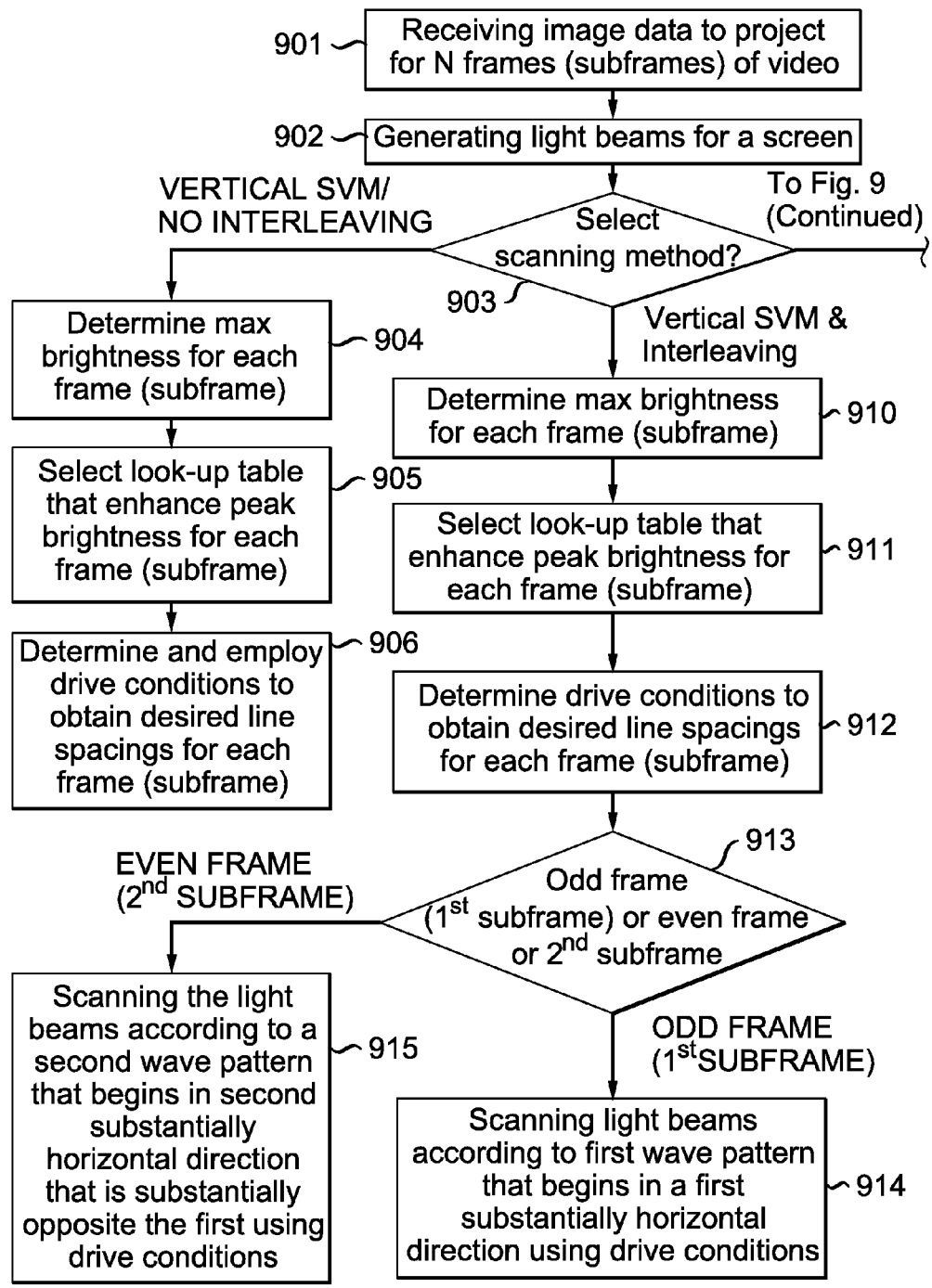
Figure 9:
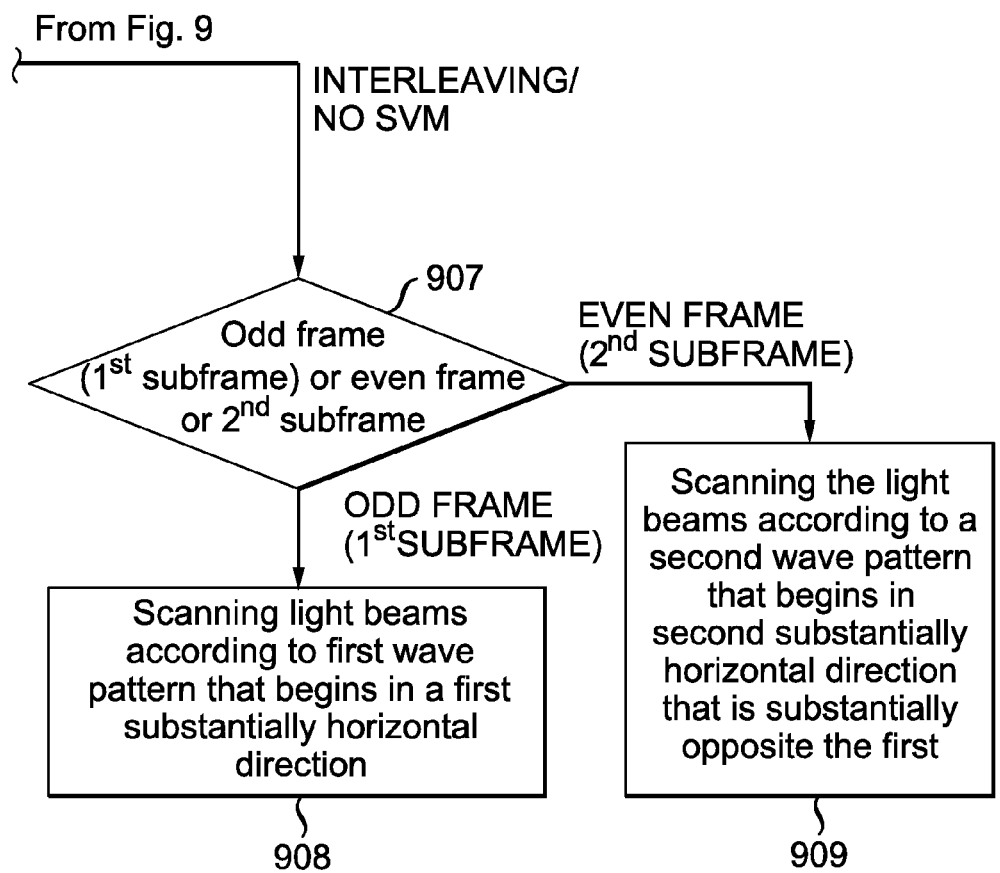

The FIG. 4 shows a block diagram of the system architecture according to the invention;

FIG. 5 shows views of the raster scan patterns of interleaved scanning according to the invention;

FIG. 6 shows a view of another interleaving approach according to the invention;

FIG. 7 shows a raster scan pattern set combining variable and interleaved scanning according to the invention;

FIG. 8 shows another raster scan pattern set combining variable and interleaved scanning according to the invention; and FIG. 9 is a flowchart representing various uses of the implementations of the invention.

DETAILED DESCRIPTION OF THE EMBODIMENT(S)

To increase the peak brightness and maintain and/or improve image uniformity of miniature displays, which can be laser based or light emitting diode based, embodiments of the invention are disclosed that incorporate certain modulations of the scan velocity and/or interleaved scanning patterns.

An important consideration in the miniature display incorporated in the invention is that unlike in CRTs, which require a blanked horizontal retrace interval to produce a uniform horizontal scan pattern, a blanking horizontal retrace is not practical. The reason is a horizontal retrace during the actual image producing phase would reduce the effective display brightness by half. This is due to the fact that the retrace time for laser or LED beam is equal to the active scan time.

The invention can incorporate a single mirror, a micromirror, a collection of mirrors or micromirrors, or a fiber optic cable system having servo steering system mechanism to raster-scan the beams. It is important to note that although the term mirror will be mentioned throughout the specification, it is intended that other suitable means of scanning light beams are considered features of the invention which could include micromirrors, collections of mirrors, scannable fiber optic cables, and the like.

The horizontal scan motion is created by running the horizontal axis at its resonant frequency, which can be about 18 KHz. The horizontal scan velocity varies sinusoidally with position. It is also important to note that although the expressions horizontal and sinusoidally are used, it is intended that embodiments of the invention can be systems in which the raster scan is rotated and it is further intended that other wave patterns such as various zigzag configurations, sawtooth configurations, and other suitable transverse wave patterns are suitable embodiments with the understanding that the beams are intended to be scanned in both directions of wave cycles.

A scan controller of the mirror or mirror system can use feedback from sensors on the scanner to keep the system on resonance and at fixed scan amplitude. The image is drawn in both directions as the scanner sweeps the beam back and forth. This helps the system efficiency in two ways. First, by running on resonance, the power required to drive the scan mirror is minimized. Second, bi-directional scanning (i.e. projecting light during left and right sweeps) maximizes the beam use efficiency by minimizing the video blanking interval. This results in a brighter projector for any given laser or light output power.

Figure 1A:
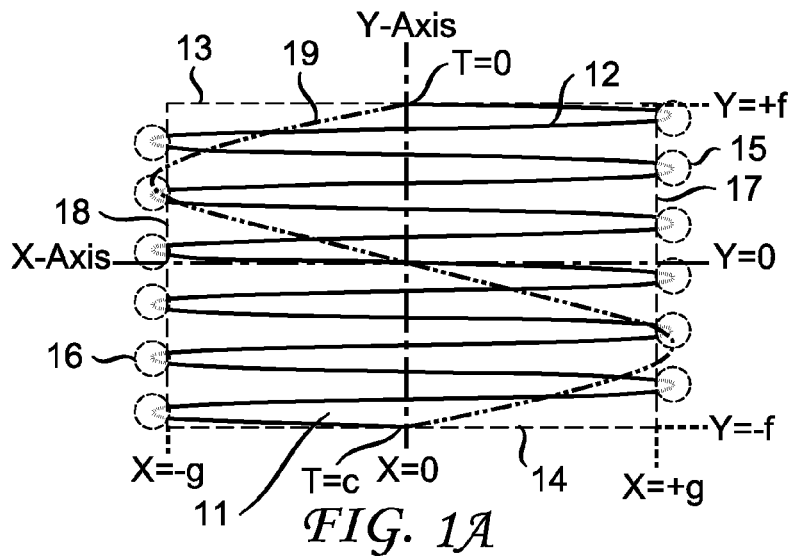
FIG. 1 shows views of a composite raster scan pattern and component vertical and horizontal scan patterns incorporated in the invention.

The vertical scan direction can be driven with a standard sawtooth waveform to provide constant velocity from the top to the bottom of the image and a rapid retrace 19 back to the top to begin a new frame as shown in FIG. 1. The frame rate can be 60 Hz for an 848×480 WVGA resolution; the frame rate or resolution can be increased under some conditions or for some particular application requirements (e.g., in a system where particular frames of video are to be flashed or scanned multiple times). Views of a general raster scan pattern utilized by the invention are shown in FIG. 1. Specifically, FIG. 1A shows how the beams of light 12 of the projector are scanned by the mirror (or mirror system) across a screen or wall 11. In the particular example, FIG. 1A shows that the result of the mirror rotating horizontally across the X-axis and vertically along the Y-axis as a function of time in which T=0 can be a time in which the light 12 is first projected on the screen 11. Time T=0 can correspond to the top 13 of the screen as shown in FIGS. 1A and T=0 can begin at horizontal level Y=+f. T=c can correspond to the bottom 14 of the viewable screen and T=c can be at horizontal level Y=−f. FIG. 1A further shows that the mirror raster scans the beams 12 sinusoidally downward from Y=+f at T=0 to Y=−f at T=c which effectively completes an image of video for one frame or subframe of video data. The number of individual scans to the right and left of the beams can vary depending on the system requirements and/or characteristic such as the designed resolution and the number pixels for the display. Each individual full scan cycle can include an overscanned right blanking region 15 at the far right of the scan as the beam reaches the vertical right edge 17 of the screen at vertical position X=+g and an overscanned left blanking region 16 at the far left of the scan as the beam reaches the vertical left edge 18 of the screen at vertical position X=−g. The overscanned blanking regions are areas outside the viewable screen in which the beams are either not on or the beams are appropriately shielded. There can be overscanning at the bottom 14 and top 13 of the screen 11 in which the mirror is projected vertically to positions corresponding to beyond the viewable screen edges.

Figure 1B:
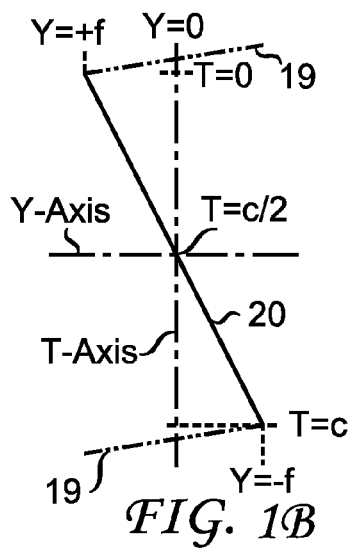
Figure 1C:
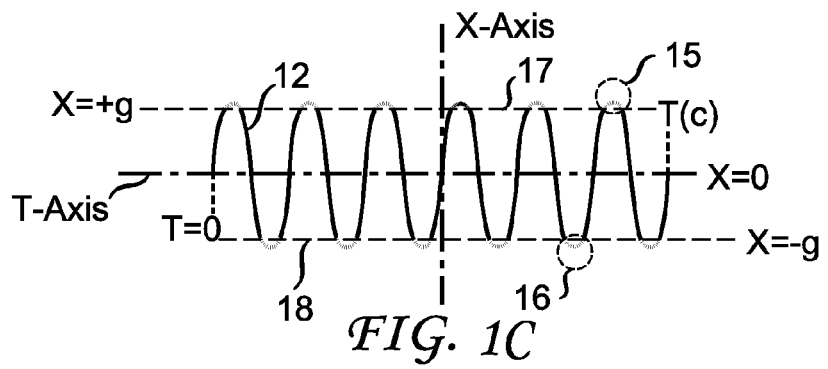

FIG. 1B shows the vertical component of the scan mirror and FIG. 1C shows the horizontal component of the scan mirror. FIG. 1B shows how the mirror scans the beams downward from the top 13 of the screen at Y=+f at T=0 to the bottom Y=−f at T=c. In FIG. 1B, the vertical axis is the time axis and the horizontal axis is the Y-axis.

FIG. 1C shows how mirror oscillates the beams laterally right from center line X=0 at T=0 toward the right edge 17 and into the overscanned blanking region 15, then toward the left toward the left edge left 18, then toward the right edge 17, and so on until the beams reach center line X=0 at T=c. FIG. 1C also shows the overscanned blanking regions 16, 15, which are the projected positions beyond X=−g and X=+g to which the mirrors are directed at the extremes of the sinusoidal cycles.

With reference to FIG. 1B, it is important to point out that the slope of the vertical component is linear and is ideal if the intensity needed for a particular image frame of video is uniform through the frame. However, a key feature of the invention is the rate of the vertical component changes during a particular frame of video when the intensity needed for the particular frame is not uniform in that some areas require greater brightness than others. As such, technically when there is to be a brightness change from one lateral region to an adjacent lateral region, the second derivative of the Y position with respect to the time T will become non-zero and the slope of the Y position with respect to the time T will increase if brightness is to be reduced and will decrease if the brightness is to be decreased.

Figure 2B:
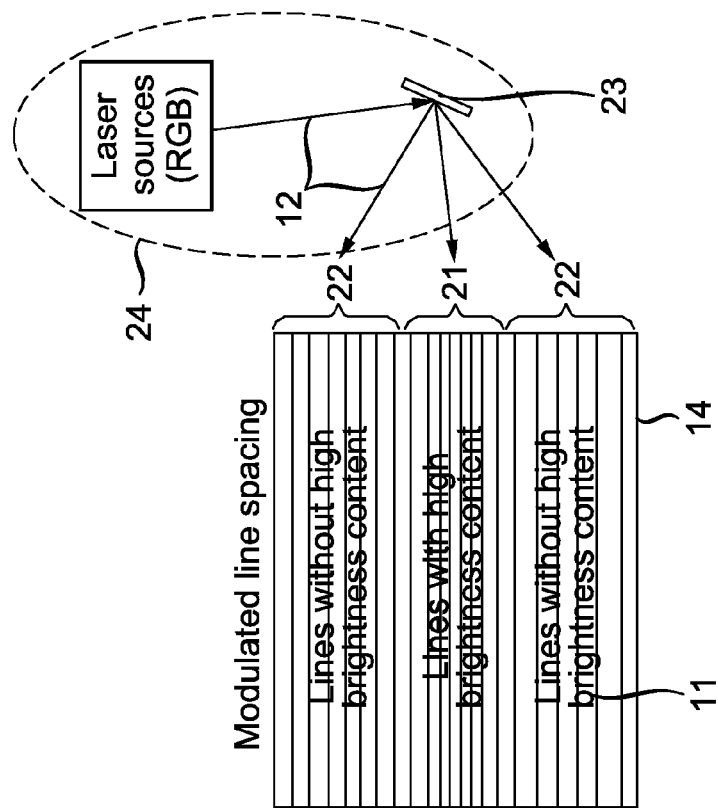
FIG. 2 shows views of raster scan patterns for a video image having a uniform brightness and a video image having non-uniform brightness.
Figure 2A:
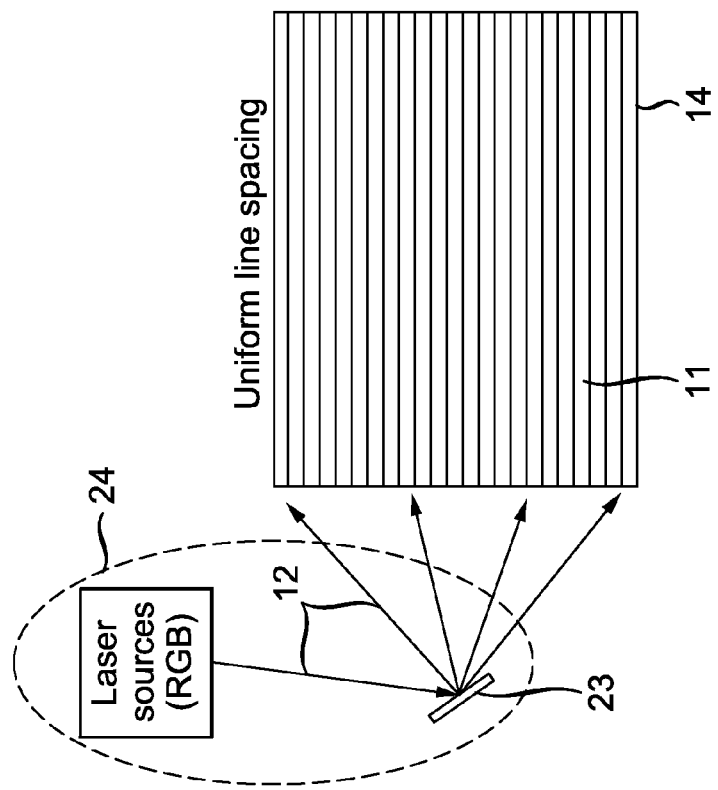

FIG. 2A shows an example expected scan line spacing of the color beams 12 of the projector 24 as they are scanned when using the vertical scan rate shown in FIG. 1B. The vertical scan here has a constant slope 20.

FIG. 2B in contrast shows how scan line spacing can be varied by intentionally varying the vertical scan velocity during different portion of a raster scan. In such a case, when greater brightness is required, the vertical rate component is slowed downed in regions which need greater brightness. When less brightness is required, the vertical rate component is increased. In this example, the middle lateral portion of the screen in FIG. 2B is a slow scan region 21 and this region is surrounded by two fast scan regions 22, thereby more efficiently supplying additional light to region 21 at the expense of regions 22.

FIGS. 3A and 3B show examples of the invention when one video frame requires a uniform brightness and another frame requires a non-uniform brightness. The vertical scan rate shown in FIG. 3A would produce the uniform scan line spacing result observed in FIG. 2A and vertical scan rates shown in FIG. 3B would produce the non-uniform scan line spacing result observed in FIG. 2B. FIG. 3B shows how the middle lateral portion of the screen in FIG. 2B can have a tight scan line spacing and how the upper and lower lateral portions have wider spacings. The spacing character in FIG. 2B is a result of having the slow scan region 21 surrounded by two fast scan regions 22 as shown in FIG. 3B. The fast scan implies that the slope of the vertical motion or displacement of the scan beam by the mirror with respect to time is larger than the constant or average vertical motion or displacement for a screen in which the scan line spacing is uniform throughout a frame of a screen. The slow scan implies that the slope of the vertical motion or displacement of the scan beam by mirror with respect to time is smaller than the constant or average vertical motion or displacement for a screen in which the scan line spacing is uniform throughout a frame of a screen.

In sum, the invention advantageously increases the peak brightness of the display by modulating the vertical scan velocity. More particularly, scan velocity modulation (SVM) to improve brightness is accomplished by forcing the laser beam to spend more time on the bright picture areas and less time on the dark picture areas.

It is important to point out the SVM can be performed horizontally and/or vertically. However, because the horizontal scan is high frequency and the scanning mechanism is mechanical, it is not generally practical and is presently difficult to implement horizontal SVM.

Please note that when mentioned in the context of this invention, the expression horizontal SVM is intended to mean some change in the horizontal scan velocity that will make the scan velocity deviate from the baseline horizontal trajectory character of the particular display. This means that the baseline horizontal trajectory character shown in FIG. 1C for the display, which does show some slight nonlinearity within the viewable screen region by design, is considered to have no horizontal SVM applied to it. There would have to be some slope changes with respect to the current slope character within one of the half cycles in FIG. 1C, which is responsive to brightness needs to consider the display to have horizontal SVM. Likewise it is feasible that the vertical baseline scan velocity could have some minor nonlinearity built into it for a number of reasons which could include the light sources not being laterally aligned with the screen or include geometrical peculiarities/requirements associated with beam shaping and/or screen shapes; and as such, vertical SVM is intended to mean there is some deviation in the slope of the vertical position with respect to time, which is responsive to brightness needs, from the baseline slope profile.

Although horizontal SVM can be utilized, the invention focuses more on the uses of vertical SVM, because the vertical scan component has a much lower frequency and has significantly more latitude for horizontal SVM. When vertical SVM is employed, the horizontal scan line spacing is modulated, as shown in FIG. 2B as opposed to FIG. 2A. FIG. 2B exaggerates the effect to show the principle. In practice, the modulation is limited to the extent that it prevents noticeable visibility of the scan line structure and to the extent that it prevents excessive degradation of resolution or degradation of vertical detail where scan line spacing is increased.

The FIG. 4 shows a block diagram of the system architecture for enhancing and more effectively obtaining desired peaked screen brightness. In this scheme, a line brightness detector 401 is employed to determine the maximum brightness value for each line of video. Input video is analyzed in detector 401 to determine the level of brightness needed for an individual line of video. The detector can use filtering to prevent giving too much weight to a single bright pixel. Blocks 403 of the architecture in FIG. 4 provide a set of look-up-tables. The function of each table is to map line brightness values to values indicative of desired line spacing or alternatively, desired line frequency. Multiple tables are used to provide multiple display profiles. For example, the individual look-up tables could each correspond to a different level of maximum brightness enhancement for the controller 405 to select. As such, for a given video frame, the system or controller 405 can calculate the temporal characteristics (such as total vertical scan time) and/or spacing characteristics (e.g. the collective scan line spacings) for scanning the image for the given frame associated with employing the specific look-up tables. The line spacing values associated with the implementation of each look-up table can be summed in sum block 404 to produce a frame total value for each display profile associated with each look-up table for the given frame. This summation in sum block 404 can effectively be the total vertical scan time needed to implement the parameters of the given look-up tables. The controller 405 can locate the frame total for the look-up table that most closely matches the target total or better matches the target total than at least another look-up table. This can mean that the controller 405 selects the look-up table of the available look-up tables that will produce the highest picture brightness (or produce a higher picture brightness than some other look-up table outputs) and yet allow all of the sweeps of the light beams to be completely scanned under the constraint of the fixed video frame rate. In other words, look-up tables that enhance brightness but require such changes in the vertical scan rates that cause too few or too many horizontal scans to occur and/or would require the fixed video frame rate to be reduced are not employed for that given frame. The controller 405 then implements the corresponding display profile in order to control the vertical interpolator 406 to properly place individual pixel positions on the screen.

With regards to the interpolator 406, it is important to point out that the scan lines or sweeps of the light beams are not fixed with respect to pixels for all frames on the screen for this invention. This is different than known projector systems in which the particular scan lines are dedicated to the same particular pixels on a viewing surface for all frames. Rather, in this invention, the light beam outputs are uniquely synchronized for different frames with the vertical and horizontal positioning of the mirror or scanning means such that the appropriate level of light in terms of chromaticity and luminosity are projected on the correct pixel locations on the screen as the light beams are scanned for a particular frame, wherein the physical locations and spacings of the specific scan lines vary from frame to frame and the pixels that the specific scan lines are intended to illuminate vary from frame to frame. For example, in one implementation of the invention, for one frame the fifth complete horizontal scan of the light beams can provide the needed light for 1st, 2nd, and 3rd pixels in the 8th row of screen pixels and for another frame the fifth complete horizontal scan of the light beams can provide the needed light for 1st, 2nd, and 3rd pixels in the 6th row of screen pixels.

Anyway, the controller 405 provides inputs to modulate the beams in the brightness modulator 407 and correspondingly drives the vertical scan control 408 to select the appropriate scan velocity modulation. The controller 405 and a video frame delay processor 402 are both used as inputs to the vertical interpolator 406. In order to keep the total number of display scan lines constant, scan lines that are displayed more closely together must be offset by scan lines that are displayed further apart. The video frame delay 402 can be employed to ensure that the controller 405 is given ample time to determine the best or better look-up table to employ and to determine the appropriate values or control signals to employ to the drive the system components for the given frame. Because the desired spacing per scan line is a nonlinear function of brightness, the look-up-tables can be used to determine the best balance of brightness enhancement.

The table below shows an example of a look-up-table representing a profile to double picture brightness.

| line max brightness (input) | brightness goal | laser max | scan line spacing (output) |
|---|---|---|---|
| 0 | 0 | 0 | 2.00 |
| 5 | 10 | 20 | 2.00 |
| 10 | 20 | 40 | 2.00 |
| 15 | 30 | 60 | 2.00 |
| 20 | 40 | 80 | 2.00 |
| 25 | 50 | 100 | 2.00 |
| 30 | 60 | 100 | 1.67 |
| 35 | 70 | 100 | 1.43 |
| 40 | 80 | 100 | 1.25 |
| 45 | 90 | 100 | 1.11 |
| 50 | 100 | 100 | 1.00 |
| 55 | 110 | 100 | 0.91 |
| 60 | 120 | 100 | 0.83 |
| 65 | 130 | 100 | 0.77 |
| 70 | 140 | 100 | 0.71 |
| 75 | 150 | 100 | 0.67 |
| 80 | 160 | 100 | 0.63 |
| 85 | 170 | 100 | 0.59 |
| 90 | 180 | 100 | 0.56 |
| 95 | 190 | 100 | 0.53 |
| 100 | 200 | 100 | 0.50 |

For a line with maximum brightness of 100, the line spacing would be 0.50 units, wherein 1.00 units is the line spacing dimension for uniform spacing of the horizontal scan lines. Thus, a spacing of 0.50 units doubles the effective brightness compared to known projector operating conditions. For lines with 25 or lower max brightness, the scan line spacing would be 2.00 and the laser intensity would need to quadruple to compensate for the combined double scan line height and double brightness goal. Depending on picture content, this profile may or may not provide a frame total that matches the target total. In cases where the frame total is insufficient, the picture brightness enhancement would need to be throttled back. In cases where the frame total is more than needed, the scan line spacing would be decreased proportionately across the frame. In either situation, look-up tables with profiles corresponding to these cases would be used to direct the controller. Note that in this example, the look-up table provides a scan line spacing output. In an alternative approach, the look-up table would provide a scan line frequency output.

Other look-up tables for example can provide an opportunity to effectively enhance the brightness by 1.25, 1.5, 3, or 4 times that for operating the system using the conventional non-variable scan rates. For example, other look-up tables could correspond to having 1.25 (brightness goal 125), 1.5 (brightness goal 150), 3 (brightness goal 300), and 4 (brightness goal 400) times enhancement and could have the scan line spacing minimum outputs at 0.80, 0.67, 0.33, and 0.25, respectively. For these other look-up tables, the brightness goal point where the scan line spacings begin to vary from 2.0 (output) can be at 60 as in the table above or could be at some other level and the specific values in between the largest scan line spacings and smallest scan line spacings can be scaled in a similar fashion as that in the table above. The one table shown above and the examples are merely illustrative of the concept of using the invention. Actual look-up tables can include more data and can incorporate different values.

In sum with regards to this feature of scan modulation, a miniature projector such as laser micro projector or light emitting diode micro projector is provided that improves brightness by employing scan velocity modulation of the mirror that scans the beams on the screen. To increase brightness, the laser beam or light spends more time on screen regions which are supposed to have higher brightness; consequently, the laser beam spends less time on screen regions which are supposed to be lower brightness regions. To keep the display height constant, scan lines which are more closely together are offset with scan lines displayed further apart. The system can have one mirror as shown in FIG. 2 or it can have a plurality of mirrors. Also, there can be a plurality of lasers each for a different primary color. Additionally, the disclosure can be characterized as a method of operating a miniature projector system having raster scanning mirror or mirrors: receiving an image having a predetermined target brightness for each region of the image to project; and raster scanning the image onto a screen with the mirror or mirrors such that the horizontal scan rate of the mirror is generally inversely proportional the target brightness for the regions.

Another characteristic of miniature projectors is the non-uniform scan pattern. This can often be the result of the concession made to improve brightness.

Figure 5B:
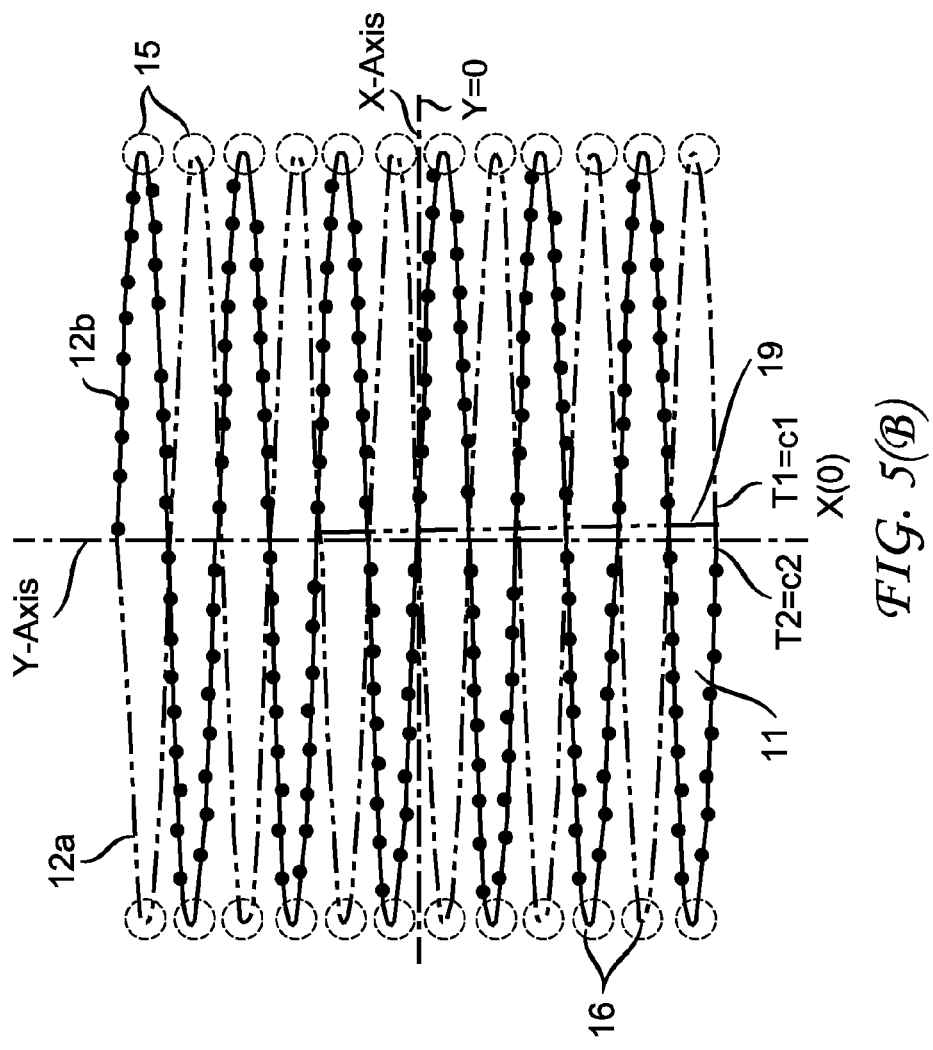
Figure 5A:
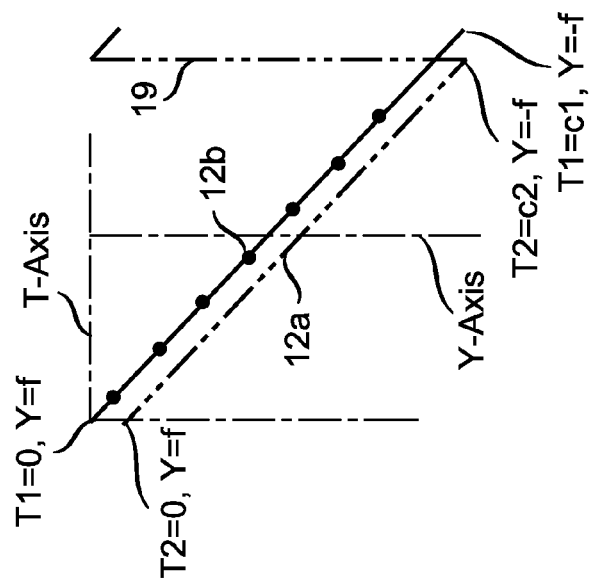

The second feature of the disclosure is interleaved scanning which can be used alone or in conjunction with constant vertical velocity scanning or variable scanning in order to improve display uniformity that can be created by the variable velocity scanning. FIGS. 5A and 5B show an example of the interleaved scanning concept with constant vertical velocity scanning. FIG. 5A specifically shows the vertical scanning components for the two complete adjacent or back-to-back full screen scans of first beams 12a and second beams 12b that make up the interleaved pattern shown in FIG. 5B. FIG. 5B shows how the first scan of beams 12a begins at time T1=0, vertical position Y=+f. Beams 12a are scanned sinusoidally to oscillate horizontally as they are directed downward at the constant rate (or at their baseline rates) as shown in FIG. 5A to vertical position Y=−f at T1=c2. The scan of beams 12a begins by first directing the beams to the left and towards the overscan region (i.e. left blanking region 16) at the far left of the scan in a similar fashion as shown and described with respect to FIG. 1. FIG. 5B shows how the second scan of beams 12b begins at vertical position Y=+f at time T2=0, which is after T2=c1. The beams 12b for the second scan are scanned sinusoidally to oscillate horizontally as they are directed downward at the constant rate; however, here the scan begins by first being directed to the right and can be overscanned to a right blanking region 15 at the far right of the scan in a similar fashion as shown and described respect to FIG. 1. The interleaving then continues with alternation of scans of first and second beams 12a, 12b.

There are two ways for interleaving to be applied. The first is that one scan of first beam 12a represents a complete frame of video and the next scan of the next beam 12b represents a different complete frame of video in which each adjacent scan line within the given scan of the first beams 12a or the second beams 12b represent adjacent scan lines of video data. FIG. 5B basically shows this first scenario in that the scan of beams 12a is a first complete frame in which all possible pixels are scanned and each horizontal sweep is a scan line and the scan of beams 12b is a second complete frame in which all possible pixels are also likewise scanned.

The second way for applying interleaving is that one scan of first beam 12a represents only half a frame of video and the next scan of the next beam 12b represent the second half of the frame of video in which adjacent scan lines within the scan of the first beams 12a itself or the second beams 12b itself represent two scan lines video data are spaced apart by a gap, wherein the gap is filled in by scan lines of video data from the scanning of the other half of the frame of video. A simplified view of this interleaving approach is shown in FIG. 6 which also shows the blanking regions 15, 16 on the left and right sides of the screen. More specifically, FIG. 6 shows that about half of the frame of video data is scanned first by beams 12a in which odd horizontal scan lines 1, 3, 5, 7, and 9 are produced in which the beams are scanned from a first top edge 13a to a first bottom edge 14a. Next, FIG. 6 shows that the other half of the frame of video data is scanned by beams 12b in which even horizontal scan lines 2, 4, 6, 8, and 10 are produced in which the beams are scanned from a second top edge 13b to a second bottom edge 14b. In other words, the interleaved scan of this type can be accomplished by a half horizontal scan line vertical shift on alternate display frames. Additionally, it is within the scope of the invention that the video data used for the scanning of the first and second beams could actually be different frames of video.

When interleaving is applied, it is preferred for the video to be re-sampled to correspond to the interleaved raster scan pattern.

The advantage of interleaving is most pronounced at the left and right sides of the image.

In sum, the second part of the invention can be characterized as a miniature projector that improves display/screen uniformity without reducing brightness by employing raster scan interleaving such that in one frame or subframe the raster scan begins in one direction and in the next frame or subframe the raster scan begins in the opposite direction. The method of operating the miniature projector could involve: receiving images to project; raster scanning a first image onto a screen with a mirror such that the odd number horizontal scan lines are scanned in one direction and even number scan lines are scanned in an opposite direction to the one direction; and raster scanning a second image onto a screen with the mirror such that the even number horizontal scan lines are scanned in the one direction and odd number scan lines are scanned in an opposite direction to the one direction. The two consecutive frames can actually be subframes, similar to that of pixel shifting.

It should be further pointed out that the second feature and first feature of the disclosure can be combined to increase brightness and yet maintain uniformity. In other words, the interleaving may correct for some of the distortions that may be created by the attempt to improve brightness by employing the variable scanning methodology.

FIG. 7 shows one raster scan pattern example set that combines the variable scan rate concept and an interleaved scanning of a first type in which first and second consecutive raster scans 703, 704 can begin at the same horizontal level at the top of the screen wherein the first scan 704 begins by scanning to the right and the second scan 703 begins by scanning to the left. In the figure, the vertical scan rate in a first screen location 702 is higher than the vertical scan rate in a second screen location 701. Although the specific example describes that the scans 703, 704 began scanning at the top it is considered within the scope of the invention that one or both of the scan could have started at the bottom and scanned upperward with conditions that provide the same patterns shown in FIG. 7.

FIG. 8 shows another raster scan pattern example set that combines the variable scan rate concept and an interleaved scanning of a second type in which first and second consecutive raster scans 803, 804 can begin at different horizontal levels near the top of the screen wherein the first scan 804 begins by scanning to the right and the second scan 803 begins by scanning to the left. In the figure, the vertical scan rate in a first screen location 802 is higher than the vertical scan rate in a second screen location 801. Although this specific example and others throughout this specification describes that the scans begin at the top it is considered within the scope of the invention that some or all scans can start at the bottom and scan upward to provide the various patterns shown in the figures.

FIG. 9 represents a flowchart for implementations of the invention. Block 901 represents the step of receiving image data of a plurality of frames or subframes to project. Block 902 represents the step of generating multiple light beams (12, 12a, 12b) from a source for projection unto a screen (11). Block 903 is a decision step for selecting whether to implement interleaving without scan velocity modulation, to implement interleaving with scan velocity modulation, or to implement scan velocity modulation without interleaving. If interleaving without scan velocity modulation is selected than one proceeds to block 907 to assign the manner of scanning the individual frames or subframes of video. Block 908 represents the scanning of the light beams (12a) according to a first pattern for odd numbered frames or first subframes assigned in block 907. The scanning of the first pattern begins from a first edge (13a) to an ending edge (14a) in the screen to form at least one image, wherein the first pattern is a wave pattern of scan lines such that amplitudes oscillate along a first axis (X-axis) as the beams progressively scan along a second axis (Y-axis), the second axis being substantially perpendicular to the first axis, and the first pattern has a first oscillation from the first edge that is directed in a first direction along the first axis. Block 909 represents the scanning of the light beams (12a) according to a second pattern for even numbered frames or second subframes assigned in block 907. The scanning of the first pattern begins from a second edge (13a) to a second ending edge (14a) in the screen to form at least another image, wherein the second pattern is a wave pattern of scan lines such that amplitudes oscillate along the first axis as the beams progressively scan along the second axis and the second pattern has a first oscillation from the second edge that is directed in a second direction along the first axis that is opposite the first direction.

If scan velocity modulation is selected without interleaving than one proceeds to block 904. Block 904 represents the step of analyzing the brightness characteristic for the individual frames or subframes of the video data, wherein the line brightness detector 401 is employed to determine the maximum brightness value for each line of video. The next block 905 represents the analysis and selection of the look-up tables 403 by the controller 405 in which the controller 405 can calculate the temporal characteristics (such as total vertical scan time) and/or spacing characteristics (e.g. the collective scan line spacings) for scanning the image for the given frame or subframe associated with employing the specific look-up tables. The line spacing values associated with the implementation of each look-up table can be summed in sum block 404 to produce a frame or subframe total value which can also be included in block 905. The next step is represented by block 906 and includes determining and employing the drive conditions for the light sources and the vertical and horizontal scan profiles. This step can involve employing variable scan velocity values in the second axis, assigning scan velocity values that are responsive to brightness level required for the image data, setting the scan velocity values to be inversely related to total brightness levels required for complete scan lines that are oriented along the second axis, and/or configuring the scan lines to be non-uniformly spaced responsive to brightness levels required for the image data, wherein the image data can comprise n number of complete frames of video and there are a fixed number of scan lines from one frame to another frame.

If scan velocity modulation is selected with interleaving than one proceeds to block 910. Block 910 represents the step of analyzing the brightness characteristic for the individual frames or subframes of the video data, wherein the line brightness detector 401 is employed to determine the maximum brightness value for each line of video. The next block 911 represents the analysis and selection of the look-up tables 403 by the controller 405 in which the controller 405 can calculate the temporal characteristics (such as total vertical scan time) and/or spacing characteristics (e.g. the collective scan line spacings) for scanning the image for the given frame or subframe associated with employing the specific look-up tables. The line spacing values associated with the implementation of each look-up table can be summed in sum block 404 to produce a frame or subframe total value which can also be included in block 911. The next step is represented by block 912 and includes determining the drive conditions for the light sources and the vertical and horizontal scan profiles for desired line spacings. This step can involve determining desired variable scan velocity values in the second axis, assigning scan velocity values that are responsive to brightness level required for the image data, having the scan velocity values to be inversely related to total brightness levels required for complete scan lines that are oriented along the second axis, and/or configuring the scan lines to be non-uniformly spaced responsive to brightness levels required for the image data, wherein the image data can comprise n number of complete frames of video and there are a fixed number of scan lines from one frame to another frame. The next block 913 is the assignment of the manner of scanning the individual frames or subframes of video. Block 914 represents the scanning of the light beams 12a according to a first pattern for odd numbered frames or first subframes assigned in block 913. The scanning of the first pattern begins from a first edge 13a to an ending edge 14a in the screen to form at least one image, wherein the first pattern is a wave pattern of scan lines such that amplitudes oscillate along a first axis (X-axis) as the beams progressively scan along a second axis (Y-axis), the second axis being substantially perpendicular to the first axis, and the first pattern has a first oscillation from the first edge that is directed in a first direction along the first axis. Block 915 represents the scanning the light beams 12a according to a second pattern for even numbered frames or second subframes assigned in block 913. The scanning of the first pattern begins from a second edge 13a to a second ending edge 14a in the screen to form at least another image, wherein the second pattern is a wave pattern of scan lines such that amplitudes oscillate along the first axis as the beams progressively scan along the second axis and the second pattern has a first oscillation from the second edge that is directed in a second direction along the first axis that is opposite the first direction.

The foregoing illustrates only some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents. For example, although many of the features of the invention are described within the context of miniature projector, the invention is applicable to other projector systems.

The invention claimed is:

1. A method comprising:
   receiving image data for images to scan;
   generating light beams responsive to the image data;
   scanning the light beams according to a first pattern from a first edge to an ending edge to form at least one image, the first pattern being a wave pattern of scan lines such that amplitudes oscillate along a first axis as the beams progressively scan along a second axis, the second axis being substantially perpendicular to the first axis, wherein the first pattern has a first oscillation from the first edge that is directed in a first direction along the first axis;
   scanning the light beams according to a second pattern from a second edge to a second ending edge to form at least another image, the second pattern being a wave pattern of scan lines such that amplitudes oscillate along the first axis as the beams progressively scan along the second axis, wherein the second pattern has a first oscillation from the second edge that is directed in a second direction along the first axis that is opposite the first direction;
   configuring the image data to be n number of complete frames of video having m scan lines oriented along the first axis;
   configuring each complete frame to comprises a first subframe and a second subframe;
   assigning some rows of the m scan lines to the first subframe, wherein the first patterns correspond to the first subframe; and
   assigning other rows of the m scan lines to the second subframe, wherein the second patterns correspond to the second subframe;
   wherein a plurality of the first and second patterns of the light beams are alternatingly scanned.

2. The method of claim 1 comprising configuring the image data to be n number of complete frames of video, wherein n is a whole number, the first patterns correspond to odd number frames of the n number of complete frames and the second patterns correspond to the even number frames of the n number of complete frames.

3. The method of claim 2 comprising aligning the first edge with the second edge to be equidistant from the first axis.

4. The method of claim 1 comprising positioning the first edge and the second edge to be at different distances from the first axis.

5. The method of claim 1 comprising employing at least three laser beams of different colors to generate the light beams.

6. The method of claim 5 comprising employing at least one scanning mirror to scan the three laser beams of different colors to generate the light beams.

7. The method of claim 1 comprising employing at least three light emitting diodes to generate the light beams of different colors.

8. The method of claim 7 comprising employing at least three light emitting diodes to generate the light beams of different colors.

9. The method of claim 1 comprising employing a variable scan velocity values in the second axis.

10. The method of claim 9 comprising assigning scan velocity values that are responsive to brightness levels required for the image data.

11. The method of claim 10 comprising setting the scan velocity values to be inversely related to a total brightness levels required for complete scan lines that are oriented along the first axis.

12. The method of claim 1 comprising configuring the scan lines to be non-uniformly spaced, wherein the image data comprises n number of complete frames of video and there are a fixed number of scan lines from one frame to another frame.

13. The method of claim 12 comprising assigning scan line spacing values responsive to brightness levels required for the image data.

14. The method of claim 13 comprising setting the spacing values to be inversely related to a total brightness levels required for complete scan lines of the image data that are oriented along the first axis.

15. A miniature projector, comprising:
    a source of at least three different light beams of different color;
    a raster scanner the light beams to a viewing surface;
    wherein the beams are steered in a first pattern and a second pattern;
    wherein the first pattern being a wave pattern of scan lines such that amplitudes oscillate along a first axis as the beams progressively scan along a second axis that is perpendicular to the first axis, the first pattern has a first oscillation from a first edge that is directed in a first direction along the first axis;
    wherein the second pattern being a wave pattern of scan lines such that amplitudes oscillate along the first axis as the beams progressively scan along the second axis, the second pattern has a first oscillation from a second edge that is directed in a second direction along the first axis that is opposite the first direction;
    wherein the raster scanner is adapted to scan the light beams according to the first pattern from the first edge to an ending edge on the viewing surface to form at least one image and the raster scanner is adapted to scan the light beams according to the second pattern from the second edge to a second ending edge in the viewing surface to form at least another image;
    and wherein the raster scanner is adapted to alternatingly scan a plurality of the first and second patterns of the light beams.

16. The miniature projector of claim 15, wherein
    the raster scanner is configured to process image data to be n number of complete frames of video having m scan lines oriented along the first axis;
    the raster scanner is configured to have each complete frame comprise a first subframe and a second subframe;
    the raster scanner is configured to assign odd number rows of the m scan lines to the first subframe, wherein the first patterns correspond to the first subframe; and
    the raster scanner is configured to assign even number rows of the m scan lines to the second subframe, wherein the second patterns correspond to the second subframe.

17. The miniature projector of claim 15, wherein
    the raster scanner is configured to process the image data to be n number of complete frames of video, wherein n is a whole number, the first patterns corresponding to odd number frames of the n number complete frames and the second patterns correspond to the even number frames of n number of complete frames.

18. The miniature projector of claim 15, wherein
the raster scanner is configured vary scan velocity values within each of the first patterns and seconds patterns responsive to brightness levels required for the image data such that the scan velocity values are inversely related to a total brightness levels required for complete scan lines that are oriented along the first axis.

19. A method comprising:
receiving image data for images to scan;
generating light beams responsive to the image data;
scanning the light beams according to a first pattern from a first edge to an ending edge to form at least one image, the first pattern being a wave pattern of scan lines such that amplitudes oscillate along a first axis as the beams progressively scan along a second axis, the second axis being substantially perpendicular to the first axis, wherein the first pattern has a first oscillation from the first edge that is directed in a first direction along the first axis;
scanning the light beams according to a second pattern from a second edge to a second ending edge to form at least another image, the second pattern being a wave pattern of scan lines such that amplitudes oscillate along the first axis as the beams progressively scan along the second axis, wherein the second pattern has a first oscillation from the second edge that is directed in a second direction along the first axis that is opposite the first direction;
employing a variable scan velocity values in the second axis;
assigning scan velocity values that are responsive to brightness levels required for the image data; and
setting the scan velocity values to be inversely related to a total brightness levels required for complete scan lines that are oriented along the first axis.

20. A method comprising:
receiving image data for images to scan;
generating light beams responsive to the image data;
scanning the light beams according to a first pattern from a first edge to an ending edge to form at least one image, the first pattern being a wave pattern of scan lines such that amplitudes oscillate along a first axis as the beams progressively scan along a second axis, the second axis being substantially perpendicular to the first axis, wherein the first pattern has a first oscillation from the first edge that is directed in a first direction along the first axis;
scanning the light beams according to a second pattern from a second edge to a second ending edge to form at least another image, the second pattern being a wave pattern of scan lines such that amplitudes oscillate along the first axis as the beams progressively scan along the second axis, wherein the second pattern has a first oscillation from the second edge that is directed in a second direction along the first axis that is opposite the first direction;
configuring the scan lines to be non-uniformly spaced, wherein the image data comprises n number of complete frames of video and there are a fixed number of scan lines from one frame to another frame;
assigning scan line spacing values responsive to brightness levels required for the image data; and
setting the spacing values to be inversely related to a total brightness levels required for complete scan lines of the image data that are oriented along the first axis.

* * * * *